United States Patent
Pergola

[15] 3,655,048
[45] Apr. 11, 1972

[54] METHOD AND APPARATUS FOR TREATING AND DISPOSING OF SEWAGE

[72] Inventor: Nicola F. Pergola, 87 89th Street, Brooklyn, N.Y. 11209

[22] Filed: Jan. 8, 1971

[21] Appl. No.: 104,995

[52] U.S. Cl.................................210/67, 210/152, 210/196, 210/221
[51] Int. Cl.................................................C02c 1/12
[58] Field of Search........................210/67, 152, 196, 221

[56] References Cited

UNITED STATES PATENTS 2,094,909  10/1937  Baily et al. .....................210/152 X

*Primary Examiner*—Jim DeCesare
*Attorney*—Douglas W. Wyatt

[57] ABSTRACT

A method and apparatus for treating and disposing of sewage which includes introducing raw sewage into a liquid separator. Separating liquid sewage from the solid sewage and collecting the separated liquid in a collection reservoir. The solid sewage is passed onto a filtration conveyor where the carry over liquid is filtered by the conveyor into a filtration reservoir and the solid sewage is transported to an incinerator. The liquid in the filtration reservoir is recirculated to the collection reservoir. Air supply and diffusion device introduces diffused air into the liquid in the collection reservoir to carry suspended solid sewage therein to the surface of the liquid in the collection reservoir. The liquid and solid sewage on the surface of the collection reservoir is passed over a weir onto the filtration conveyor where the filtration, transportation, recirculation and incineration steps are repeated. The diffusion of air into the liquid, the passing of the liquid and the solid sewage onto the filtration conveyor and the recirculation of the liquid is continued for a set period of time after the raw sewage has stopped flowing into the separator. At the termination of the recirculation cycle, the liquid is passed from the collection chamber through baffles into an effluent reservoir where the liquid is treated to reduce the bacteria count.

11 Claims, 8 Drawing Figures

3,655,048

METHOD AND APPARATUS FOR TREATING AND DISPOSING OF SEWAGE

SUMMARY OF THE INVENTION

This invention relates to a method and apparatus of sewage treatment and disposal and more particularly to an apparatus and method for treatment of human waste, sewage received from toilets, showers, kitchens or galleys, laundries, and the like. The apparatus of this invention is particularly advantageous for shipboard use and other marine application.

Many types of sewage treatment and disposal systems have been proposed and used. These systems are usually expensive and require long detention time and large tanks to be effective. Some systems generate dangerous combustible gases through electro-chemical means. Biochemical processes are frequently ineffective where salt water must be used as a flushing agent such as in the marine industry.

Sewage, particularly waste from laundries, galleys, toilets, showers, bathtubs, and similar sources is normally carried in a large volume of water. When raw sewage is introduced into a waterway, the oxygen in the water is reduced because the sewage consumes the oxygen during the normal process of oxidizing the organic solids in the sewage. When large quantities of solid organic sewage is introduced to a waterway, the ability for the water to support marine life will be decreased because of the reduced oxygen supply in the water. Excessive suspended solids reduce light penetration and produce sludge at the bottom of waterways.

It is also well known that aerobic treatment of sewage by the introduction of air specifically to oxidize the organic solid sewage requires maintenance of a delicate biochemical balance, considerable storage time and relatively large storage tanks for accomplishing this process. Long storage time and large storage tanks are expensive and are frequently impractical for use on ships, pleasure yachts, small water craft and places ashore where space is at a premium and it is undesirable to have large holding tanks for treating sewage over an extended period of time and difficult to maintain the proper required biochemical balance.

As it is known that solid organic sewage degrades the quality of waterway by reducing the oxygen necessary for marine life in the water and that excessive suspended solids create a sludge which blankets the bottom and introduces bacteria, it is highly desirable to have a relatively small, simple and automatic sewage treatment apparatus and method which will remove a substantial amount of solid sewage and which does not require expensive and complicated equipment and relatively large tanks for treating sewage over a long period of time.

Accordingly, it is an object of this invention to provide sewage treatment apparatus and method which are adapted to mechanically remove substantial amounts of solid sewage before the liquid effluent is discharged into a waterway.

It is also an object of this invention to provide such a sewage treatment apparatus and method which are advantageously adapted to effectively and continuously treat large amounts of sewage in relatively small tanks over a relatively short period of time.

It is another object of this invention to provide such a sewage treatment apparatus and method which are particularly adapted for use in the marine service.

A further object of this invention is to provide such a sewage treatment apparatus and method which is relatively simple, uncomplicated and produces an acceptable effluent which does not pollute the waterway into which it is discharged.

It has now been found that the foregoing objects and advantages can be obtained in a method and apparatus for treating and disposing of sewage wherein raw sewage is passed through a liquid separator wherein the liquid sewage is separated from the solid sewage and collected in a collection reservoir. The solid sewage is passed onto a filtration conveyor where the carry over liquid is filtered into a filtration reservoir. The conveyor transports the solid sewage on the filtration conveyor to an incinerator. The liquid in the filtration reservoir is pumped by a recirculation pump back to the collection reservoir. A grid supplies and diffuses air into the collection reservoir to oxidize suspended organic solid sewage and carry suspended solid sewage to the surface of the liquid in the collection reservoir. The liquid and solid sewage on the surface of the collection reservoir is passed over a weir onto the filtration conveyor where filtration, transportation, incineration, and recirculation processes are repeated. After the raw sewage stops flowing into the separator, there is a continuation of steps of recirculating the liquid from the filtration reservoir to the collection reservoir and diffusing air into the liquid in the collection reservoir and passing the liquid and solid sewage at the surface of the collection reservoir over a weir onto a filtration conveyor for a sufficient period of time to remove the solid sewage from the liquid.

The recirculation of the liquid from the filtration reservoir into the collection reservoir and the diffusion of air into the liquid in the collection reservoir may be continued for a sufficient period of time to allow oxidation of a portion of the suspended organic sewage in the liquid. The filtration conveyor may include a pair of continuous chain belts which support an endless series of overlapping porous grates which provide a surface for supporting the solid sewage and which is porous to filter the solid sewage from the liquid.

At the termination of each recirculation and diffusion cycle, the liquid is passed through a valve arrangement or a perforated plate at the bottom of the collection reservoir, through a pair of staggered baffles, over a weir which is lower in height than the weir between the collection and filtration reservoirs, into the effluent reservoir. The valve arrangement may consist of sliding perforated plates or discs, or a rotating slotted or perforated tube or cylinder, each automatically power operated by an air or hydraulic cylinder.

A chemical substance is added to the liquid in the effluent reservoir, or ultra-violet purification is used as the effluent is discharged, to kill micro-organisms and bacteria. The harmless effluent is discharged to the waterway.

DESCRIPTION OF THE DRAWINGS

Various other objects and advantages of this invention will be apparent from the detailed description, claims and drawings appended hereto wherein:

Figure 2:
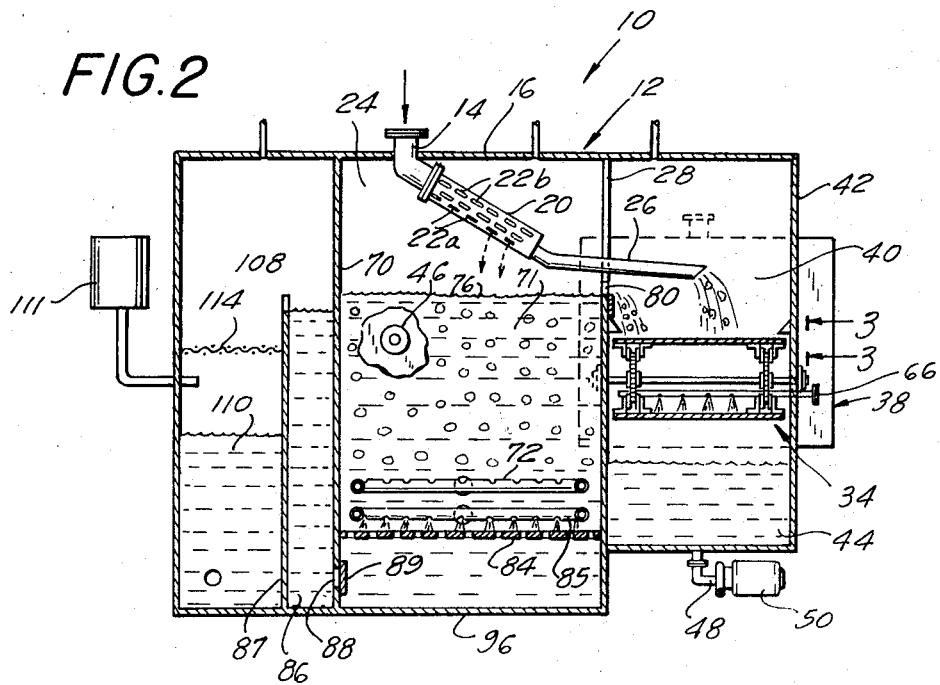
FIG. 2 is a sectional view taken along lines 2—2 of FIG. 1.

Referring now in detail to the drawings, the sewage treatment apparatus of this invention, generally designated by the reference numeral 10, includes a compartmented tank 12 which may be fabricated of metal, concrete, plastic, or other suitable non-corrosive water impermeable materials. The raw sewage influent enters the compartmented tank 12 through an elbow type pipe inlet connection 14 which is mounted on and passed through the top wall 16 of the tank 12. A device for shredding large solids may be placed before the inlet connection 14 A grease interceptor may also be placed in the line before the inlet connection 14 to remove grease from kitchen galley drains.

An elongated cylindrically shaped separator 20 extends obliquely from the pipe connection 14 where liquid sewage passes through suitable openings in the separator and drains into a collection chamber 24. As illustrated in FIG. 2, the separator 20 has relatively small apertures 22a on its underside which are of a suitable size to allow the liquid sewage to drain from the separator 20 while inhibiting the passage of solids. The oblique angle at which the separator 20 is disposed aids in allowing the liquid sewage to drain from the separator 20 through apertures 22a while allowing the solid sewage to readily pass through the separator 20. The relatively larger apertures 22b on the upperside of the separator 20 to allow rapid dissipation of the liquid during heavy surges and to enhance the free flow of the sewage.

After the solid sewage passes through the separator 20 it enters a discharge conduit 26 which passes through an interior wall 28 of the compartmented tank 12 whereby the solid sewage is discharged from the conduit 26 onto a porous filtration grate conveyor 34. The grate conveyor 34 transports the solid sewage to an incinerator 38 where the solids are reduced to a harmless ash.

The filtration grate conveyor 34 is mounted within a filtration chamber 40 formed between the interior wall 28 and an exterior wall 42 of the tank 12. The filtration grate conveyor 34 has a porous support surface for transporting solid sewage, but which allows liquid carried over with the solid sewage to drain through the support surface into a filtration reservoir 44 in the lower portion of the filtration chamber 40. A recirculation pump 50, which is controlled by the level of water in the filtration chamber 40, is energized by conventional liquid level control devices to pump the liquid from the filtration chamber 40 through the conduits 48 and 49 into the collection chamber 24 through an inlet port 46 in the front wall 47 of the tank 12. When the sewage apparatus 10 is functioning the pump 50 will normally be in continuous operation.

Figure 1:
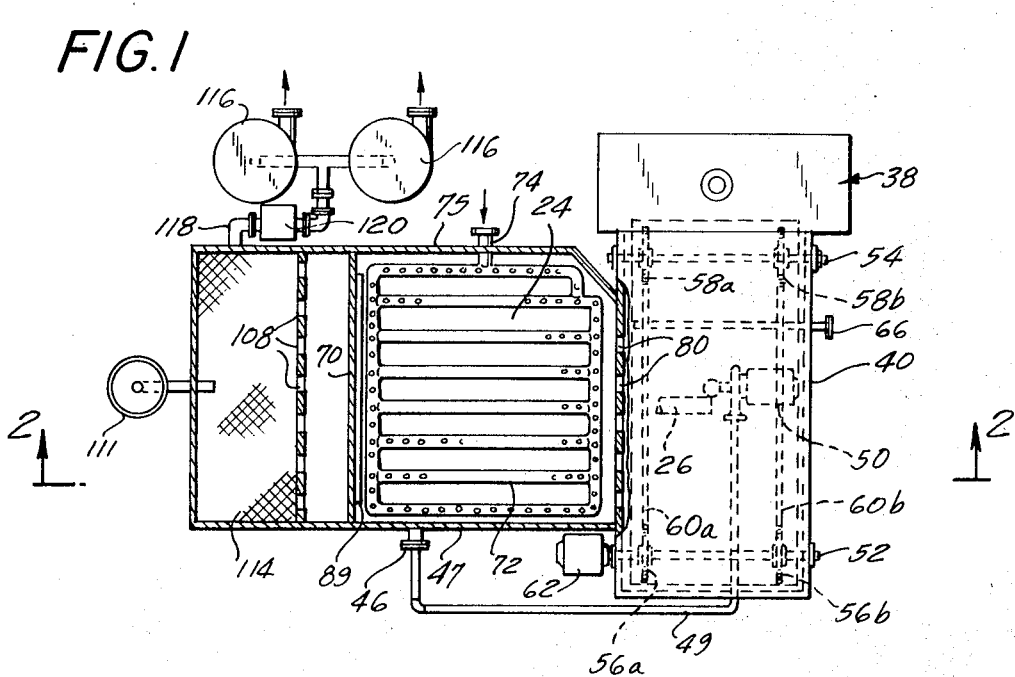
FIG. 1 is a top view of the sewage treatment apparatus of this invention.
Figure 3:
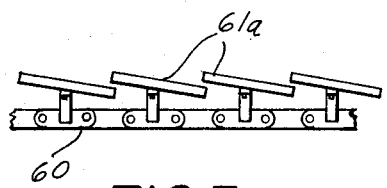
FIG. 3 is a fragmentary side view taken along lines 3—3 of FIG. 2 illustrating the construction of the perforated grate conveyor.
Figure 4:
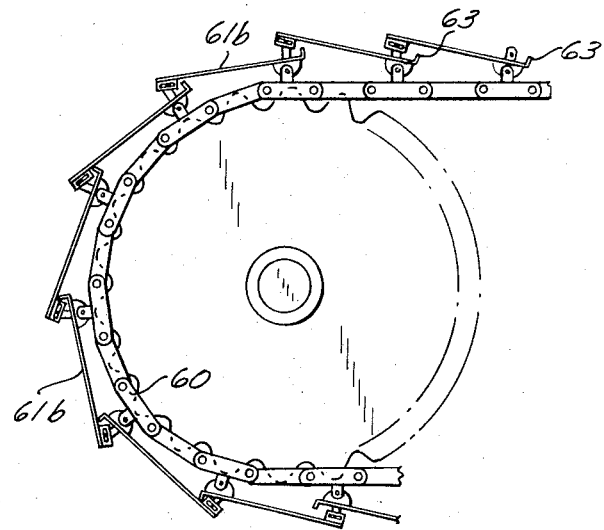
FIG. 4 is a partial side view of another embodiment of the perforated grate conveyor of this invention.

The filtration grate conveyor 34 includes a pair of shafts 52 and 54 rotatably mounted on suitably positioned bearings on the walls 28 and 42 of the tank 12. Each of the shafts 52 and 54 support pairs of sprockets 56a and 56b and 58a and 58b at opposite ends of the filtration chamber 40 as illustrated in FIG. 1. The sprockets 56 and 58 engage and drive a pair of endless chain belts 60a and 60b in the usual manner. As illustrated in FIG. 3, the chain belts 60 support an endless series of perforated metal overlapping grates 61a which receive the solid sewage from the discharge conduit 26 for transport to the incinerator 38. The grates 61a are each obliquely mounted on opposite sides on the chain belts 60 near their center portions to enhance drainage of the liquid sewage. An alternate embodiment of the metal grates is illustrated in FIG. 4 wherein perforated metal grates 61b are mounted at opposite ends on the chain belts 60 at a greater oblique angle than in FIG. 3 to further enhance drainage of liquid sewage. A flange 63 on the lower end of each grate 61b retains the solid sewage thereon. The grates 61 have support surfaces of perforated metal or other conventional porous materials which are suitable to allow the liquid to drain through the grate to filter out suspended solid sewage from the liquid. A conduit 66 is provided in the chamber 40 to clean the filtration grate conveyor 34 as necessary.

The sprockets 56 and 58 are driven in a conventional manner by an electric motor 62 which is operatively connected directly or by means of gearing to the conveyor shaft 52. The electric motor 62 is controlled by conventional electrical apparatus which senses the flow of sewage through the inlet connection 14. When the shaft 52 is rotated, the grate conveyor 34 operates to move the grates 61 pass the discharge conduit 26 to receive the solid sewage which is then transported to the incinerator 38. The control for the electrical motor 62 continues to operate the grate conveyor 34 for a set period of time after the sewage flow through the inlet pipe connection 14 has stopped in order to ensure that the sewage solids are all disposed in the incinerator 38 during the recirculation and diffusion processes.

The collection chamber 24, formed in part by the interior wall 28 and an interior wall 70, retains a reservoir 71 of liquid sewage in the tank 12. An air diffuser grid 72 is mounted in the collection chamber 24 and is disposed beneath the surface 76 of the liquid sewage in the reservoir 71. The air diffuser grid 72 has a plurality of conduits extending to cover the area of a plane across the collection chamber 24 for supplying air throughout the collection chamber 24. The diffuser grid 72 has a plurality of spaced relatively small air outlets in the grid conduits for finely diffusing air which rises rapidly to the surface 76 of the liquid. Air is supplied to the grid 72 through a conduit 74 which passes through the back wall 75 of the tank 12 and communicates with a conventional supply source. The air is supplied to the conduit 74 and is diffused by the grid 72 in sufficient quantity to swell the liquid sewage in the reservoir 71 above the grid 72.

The action of the air bubbles passing from the grid 72 to the swelled surface 76 of the liquid sewage tends to raise suspended sewage solids in the reservoir 71 to the surface 76. The surface liquid and suspended solids then flow by gravity over a plurality of adjustable weirs 80 in the wall 28 onto the filtration conveyor 34 where the solids are transported to the incinerator 38 and liquid filtered down into the reservoir 44 of the filtration chamber 40 where the liquid is recirculated back to the collection chamber 24 by the pump 50 through the inlet port 46 which is located above the grid 72. The conventional control apparatus that senses the flow of sewage in the inlet connection 14 to start the conveyor 34 controls the supply of air to the grid 72 so that air is finely diffused up through the reservoir 71 during the raw sewage flow and for a period of time thereafter when the liquid in the reservoir is being recirculated by the pump 50 in order to ensure the maximum removal of suspended sewage solids.

A perforated horizontal baffle plate 84 is mounted in the collection chamber 24 below the air diffuser grid 72 in order to inhibit and control the flow of sewage from the reservoir 71. A manually operable steam (or air) line 85 is positioned above the baffle plate 84. The steam (or air) line 85 is adapted to direct steam on the top surface of the baffle plate 84 to recirculate solid sewage deposited there back up into the streams of air bubbles coming from the grid 72.

A valve located at the bottom portion of the wall 70 controls the flow of liquid from the collection chamber 24 into a baffle chamber 86 formed by the interior wall 70 and another interior baffle wall 87. The valve controlling the flow of liquid to the baffle chamber 86 may be in the form of a plurality of apertures 88 in the lower portion of the wall 70 adjacent the bottom of the tank 12. The apertures 88 are covered or uncovered by a sliding plate 89 which is mounted in a conventional manner for vertical sliding movement on the wall 70 in order to control the flow of liquid from the collection chamber 24 into the baffle chamber 86. Normally the sliding plate 89 of the valve remains closed while the liquid sewage is being recirculated from the filtration reservoir 44 back to the collection chamber 24.

The recirculation pump 50, in addition to being controlled by the level of liquid in the filtration reservoir 44, is operated by conventional controls on a time cycle permitting recirculation of the liquid from the reservoir 44 of the filtration chamber 40 back to the collection chamber 44 for a period of time after the sewage has stopped flowing into the inlet pipe connection 14 in order to ensure that solid sewage is filtered from the liquid. The supply of air to the grid 72 is maintained during this period. After the recirculation time period has elapsed the control apparatus operates a conventional hydraulic device which raises the sliding plate 89 to allow liquid to flow through the apertures 88 into the baffle chamber 86.

Figure 7:
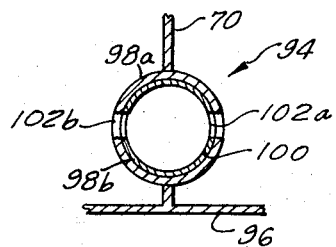
FIG. 7 is a fragmentary view of an alternate valve for controlling the flow between the chambers.
Figure 8:
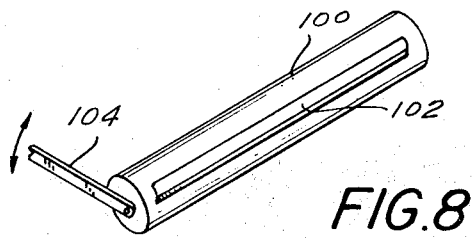
FIG. 8 is a perspective view of the elongated plug of the valve illustrated in FIG. 7.

An alternate embodiment for a valve between the collection chamber 44 and the baffle chamber 86 is illustrated in FIGS. 7 and 8. In this embodiment an elongated plug type valve, generally designated by the reference numeral 94, is mounted horizontally along the lower portion of the wall 70 just above the bottom plate 96 of the tank 12. A pair of cooperating oppositely facing arcuate sleeves 98 and 100 are mounted in spaced relationship on the side wall 70 and cooperate to rotatably support an elongated valve plug 100. A longitudinal slot 102 is formed in the plug 100 through which liquid from the collection chamber 44 flows into the baffle chamber 86. An operating arm 104 attached to the plug 100 is operatively connected to a hydraulic device for opening and closing the plug valve 94 at the desired time in the cycle.

When the valve in the wall 70 is opened, the liquid flows up through the baffle chamber 86, and over the baffle wall 87 through a plurality of weirs 108 formed in the horizontal top edge of the wall 87 and into an effluent reservoir 110. To provide for liquid flow over the baffle wall 87 the weirs 108 are below the level of the weirs 80 controlling the flow from the collection chamber 44.

As the liquid passes over the weirs 108, it passes through a final screen 114 which removes any remaining sewage solids which may be carried over with the liquid. At this point chlorine or other chemicals may be introduced into the effluent reservoir 110 through an applicator 111 to reduce the bacteria count in the effluent. The liquid is then periodically pumped from the effluent reservoir 110 by discharge pumps 116 through a discharge conduit 118. As the fluid passes through a discharge conduit 118 a conventional ultra-violet ray device 120 treats the clear effluent to further reduce the bacteria count before the effluent is finally discharged.

It should be understood that the liquid sewage is subject to an aerobic treatment while being recirculated in the collection and filtration chambers 24 and 40, due to the oxidation of the organic sewage solids by the air supplied by the air diffuser grid 72. However, although some oxidation of solid sewage occurs during the recirculation cycle to aid in the treatment of the sewage and reduce odors, the apparatus 10 relies on the mechanical filtration of solid sewage by the filtration grate conveyor 34 to remove a substantial portion of the solid sewage from the liquid.

Figure 5:
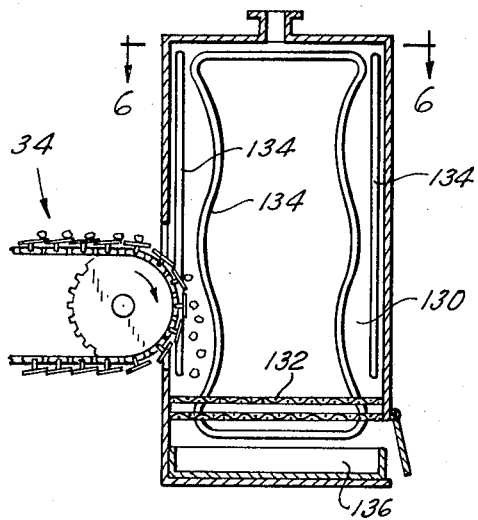
FIG. 5 is a partial sectional view illustrating the arrangement of the incinerator for the sewage treatment apparatus of this invention.
Figure 6:
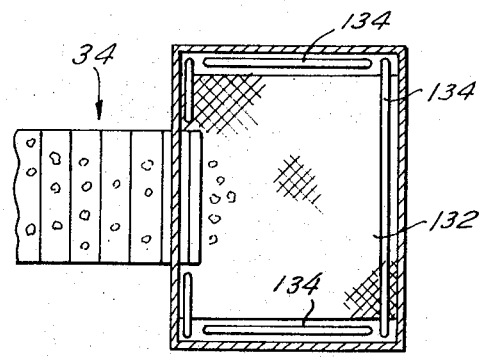
FIG. 6 is a sectional view taken along lines 6—6 of FIG. 5.

The details of the incinerator 38 are illustrated in FIGS. 5 and 6 wherein the conveyor 34 is shown discharging the solid sewage into the incinerator housing 130 wherein the solid sewage is disposed on the horizontal grates 132. Conventional electrical heaters 134 incinerate the solid sewage which then collects in the ash pan 136 where it may be readily removed in the usual manner.

It will be understood that the foregoing description with the details of exemplary structure is not to be construed in any way to limit the invention, but that modifications may be made thereto without departing from the scope of the invention as set forth in the following claims.

Having thus described the invention, what is claimed is:

1. A method of treating and disposing of sewage including passing the sewage through a liquid separator; separating a portion of the liquid sewage from the solid sewage in the liquid separator and collecting the separated liquid sewage in a collection reservoir; passing the solid sewage onto a filtration conveyor and filtering the carry over liquid into a filtration reservoir; transporting the solid sewage on the filtration conveyor to an incinerator; incinerating the solid sewage; recirculating the liquid from the filtration reservoir into the collection reservoir; supplying and diffusing air into the liquid in the collection reservoir to oxidize suspended organic solid sewage and to carry suspended solid sewage therein to the surface of the liquid in the collection reservoir; passing the liquid and solid sewage on the surface of collection reservoir over a weir onto the filtration conveyor, and repeating said filtration, transportation, incineration, and recirculation steps; and continuing said steps of recirculating the liquid from said filtration reservoir to said collection reservoir, supplying and diffusing air into the liquid in the collection reservoir, and passing the liquid and solid sewage at the surface of the collection reservoir over a weir onto the filtration conveyor for a period of time after a raw sewage has stopped flowing into said separator.

2. The method of treating sewage of claim 1 including recirculating the liquid from said filtration reservoir into said collection reservoir and diffusing air into said liquid in said collection reservoir for a period of time sufficient to allow the oxidation of a portion of the suspended organic solid sewage in said liquid.

3. The method of treating sewage of claim 2 wherein after said recirculation of said liquid from said filtration reservoir to said collection reservoir has been terminated, said liquid in said collection reservoir is passed into a baffle chamber, wherein said liquid flows over a weir at the top of said baffle chamber into an effluent reservoir.

4. The method of treating sewage of claim 3 wherein the liquid in said effluent reservoir is treated with a chemical for lowering the bacteria count of said liquid.

5. The method of treating sewage of claim 4 wherein the liquid in said effluent reservoir is held in said reservoir for a period of time after introduction of said chemical for lowering the bacteria count of said liquid.

6. The method of treating sewage of claim 5 wherein the liquid in said effluent reservoir is pumped from said effluent reservoir and passed through an ultra-violet ray means for treating said effluent liquid to further reduce the bacteria count.

7. Sewage treatment and disposal apparatus including a liquid collection chamber; a liquid separator mounted on said collection chamber, said separator being connected to receive raw sewage influent and having perforations allowing liquid sewage to drain from said separator into said collection chamber; a filtration conveyor for receiving solid sewage and carry over liquid sewage from said separator; said conveyor having a porous surface to filter the liquid sewage and support and transport the solid sewage; incinerator means receiving and incinerating the solid sewage received from said conveyor; a filtration chamber below said filtration conveyor receiving the liquid filtered through the porous surface of said conveyor; recirculating pump means for recirculating the liquid from said filtration chamber into said collection chamber; air diffusing means supplying and diffusing air in said collection chamber to oxidize suspended organic solids and to carry suspended sewage solids to the surface of the liquid in said collection chamber; a weir between said collection chamber and said filtration chamber for the liquid and solid sewage on surface of said liquid in said collection chamber to flow onto the filtration conveyor for incineration of solid sewage and filtering of said liquid.

8. The sewage treatment apparatus of claim 7 wherein said apparatus includes a baffle chamber adjacent said collection chamber, valve means disposed between said baffle chamber and said collection chamber; a weir adjacent the top of said baffle chamber for allowing the liquid therein to flow from said baffle chamber; operating means for opening said valve means after said recirculation of liquid by said pump means has been terminated.

9. The sewage treatment apparatus of claim 8 wherein said valve means includes an elongated plug valve, said valve having an elongated cylindrical plug with an elongated longitudinal slot for allowing liquid to flow from said collection chamber to said baffle chamber when said plug is in the open position.

10. The sewage treatment apparatus of claim 8 wherein an effluent reservoir is disposed adjacent said baffle chamber to receive the liquid as it passes over said baffle chamber weir, said effluent reservoir having means for introducing a chemical into said liquid for reducing the bacteria count of said liquid.

11. The sewage treatment apparatus of claim 8 wherein said filtration conveyor includes a series of overlapping porous grates mounted obliquely on a continuous chain belt.

* * * * *